(12) United States Patent
Sugiura

(10) Patent No.: US 7,189,464 B2
(45) Date of Patent: Mar. 13, 2007

(54) CELLULOSE ACYLATE FILM AND PRODUCING METHOD THEREOF

(75) Inventor: Masaru Sugiura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 294 days.

(21) Appl. No.: 10/791,804

(22) Filed: Mar. 4, 2004

(65) Prior Publication Data

US 2004/0175575 A1    Sep. 9, 2004

(30) Foreign Application Priority Data

Mar. 5, 2003    (JP) .............................. 2003-058339

(51) Int. Cl.
    *B32B 23/04*    (2006.01)
(52) U.S. Cl. ................. 428/532; 428/533; 428/534; 428/535; 428/536; 428/537.5; 536/64; 536/65; 536/68; 536/69; 536/76; 536/78; 536/80; 536/124
(58) Field of Classification Search ................ 428/532, 428/533, 534, 535, 536, 537.5; 536/64, 65, 536/68, 69, 76, 78, 80, 124
See application file for complete search history.

(56) References Cited

U.S. PATENT DOCUMENTS 6,211,358 B1 *    4/2001    Honda et al. ................. 536/64
6,767,500 B2 *    7/2004    Yamazaki et al. .......... 264/556

FOREIGN PATENT DOCUMENTS

JP    2001-318228 A    11/2001
JP    2002-192541 A    7/2002

* cited by examiner

*Primary Examiner*—Ieszek b. Kilman
(74) *Attorney, Agent, or Firm*—Birch, Stewart, Kolasch & Birch, LLP

(57) ABSTRACT

In a multi-layer structure of a cellulose acylate film, the averaged degree of acylation of surface layers is controlled in the range of 0.5 to 2.8 by mixing several sorts of cellulose acylates having different averaged degrees of acyation. One of the surface layers is formed on a substrate by casting a solution containing cellulose acylate made of cotton linter. Lubricant particles are added to a solution for the surface layers, and emission compounds to a solution for the inner layers. The obtained cellulose acylate film is excellent in adhesive property to the hydrophobic material without saponification, and adequately used for the polarizing filter, an optical compensation sheet, and liquid crystal display.

36 Claims, 5 Drawing Sheets

CELLULOSE ACYLATE FILM AND PRODUCING METHOD THEREOF

This Nonprovisional application claims priority under 35 U.S.C. § 119(a) on patent application No(s). 2003-058339 filed in JAPAN on Mar. 5, 2003, the entire contents of which are hereby incorporated by reference.

BACKGROUND OF THE INVENTION

1. Field of the Invention

The present invention relates to a cellulose acylate film and a producing method thereof, especially to a cellulose acylate film and a producing method thereof which is used as a protective film for a polarized film constructing a polarizing filter and which is used for an optical compensation film, a liquid crystal display and the like.

2. Description Related to the Prior Art

A cellulose acylate film has transparency, adequate water vapor permeability and high mechanical strength. Dimensional resistance of the cellulose acylate film does not depend on the humidity and the temperature so much. Therefore the cellulose acylate film is widely used as a base of an optical material. As a producing method of the cellulose acylate film, there is a solution casting method, in which a dope prepared from a polymer and a solvent is cast with a casting die on a substrate, and dried in a drying process to form a film.

The cellulose acylate film is also used as a protective film for a polarizing filter constructing a liquid crystal display. The polarizing filter is usually constructed of a polarized film which is formed of polyvinylalcohol, and a cellulose acylate film which is adhered to one or both of surfaces of the polarized film. As the polyvinyl alcohol is hydrophilic polymer, the film surface of the polyvinyl alcohol film has a good hydrophilic nature. Otherwise, the surface of the cellulose acylate film has a hydrophobic nature. Accordingly, in order to adhere the polyvinyl alcohol film and the cellulose acylate film, the condition of the film surfaces of at least one of the polyvinylalcohol film and the cellulose acylate film is modified.

For surface modification of the film, the film surface of the cellulose acylate film is usually saponificated. As the main saponification treatment, there are a method of coating or spraying an alkali solution on the film surface, a method of dipping the cellulose acylate film into the alkali solution (see, for example Japanese Patent Laid-Open Publication No. 2001-318228).

Further, cellulose acylate is usually produced from a wood pulp, cotton linter or the like. In the usual method of producing the cellulose acetate, for example, the wood pulp or the cotton linter is treated with acetic acid or acetic anhydride. Thus cellulose triacetate in which degree of acylation is 3 is obtained. The acetic anhydride is used as an agent for esterification, and sulfuric acid is used as a catalyst thereby. The remaining sulfuric acid as the catalyst is effective for saponification and ripening of the obtained cellulose triacetate, so as to control the degree of acylation. Thus the objected cellulose acetate is obtained. In this case, calcium compounds and the like are added so as to neutral the excess of several sorts of acid.

Japanese Patent Laid-Open Publication No. 2002-192541 teaches that cellulose acylate film contains the several sorts of compounds in order to improve the plastication and to provide optical properties. The compounds are often necessary not only in the cellulose acylate film but in several sorts of the films for optical use, in order to make the quality higher.

However, in any methods for saponification treatment to modify the surface of the cellulose acylate film, production facilities therefor are extremely large and cannot be equipped continuously just after the solution casting process. Accordingly, the cellulose acylate film produced in the solution casting method is wound and thereafter set to the system for the saponification. Then the cellulose acylate film is unwound so as to perform the saponification. In this case, the number of the producing process becomes larger by one, which prevents the higher productivity and the lower cost. Further, the saponification often causes the wrinkle and unevenness of the film, and the transparency of the film becomes lower.

The hydrophilic nature of the above cellulose acylate depends on the degree (that is an averaged degree) of acylation. When the averaged degree of acylation is low, the number of hydroxyl group contained in the same mole number of cellulose acylate is large. Accordingly, the averaged degree of acylation is preferably low in order to make the hydrophilic nature higher. However, when the averaged degree of acylation is low, the water vapor permeability, dimensional resistance of the film, peelability and the like become lower, and the cellulose acylate is not adequate for practical use.

The many sorts of the compounds added to make the quality of the film higher show poor compatibility with cellulose acylate and the like. Therefore the large amount of them precipitate on the film surface or volatilize in the film forming processes. Further, some emission compounds adhere to parts, members and the like in the film forming processes, and adhere, drop and so on to the film. Thus the quality of the produced film becomes lower.

SUMMARY OF THE INVENTION

An object of the present invention is to provide a cellulose acylate film and a producing method thereof which has good optical properties for optical use.

Another object of the present invention is to provide a cellulose acylate film and a producing method thereof for which adhesive properties to hydrophilic materials is provided without saponification process after a film forming process.

In order to achieve the objects and the other objects, a cellulose acylate film of the present invention has plural layers including two surface layers and at least one inner layer, and the averaged degree of acylation of cellulose acylate in the two surface layers are in the range of 0.5 to 2.8. The averaged degree of acylation of cellulose acylate in the inner layer is higher than that of the two surface layers.

In the preferable embodiment of the present invention, one of the two surface layers is stacked on a hydrophilic material.

A cellulose acylate film of the present invention has plural layers in which the averaged degrees of acylation of cellulose acylate are different, and a surface layer of the plural layers that is to be stacked on the hydrophilic material. The averaged degree of acylation of cellulose acylate in the surface layer is in the range of 0.5 to 2.8, and the averaged degree of acylation of each layer is adjusted by mixing plural cellulose acylates having different averaged degree of acylation.

A cellulose acylate film of the present invention has plural layers including at least a first layer and a second layer, and said first layer has a first surface to be stacked on said hydrophilic material and a second surface on which said second layer is formed. The averaged degree of acylation of the first layer is in the range of 0.5 to 2.8, and the averaged degree of acylation of the second layer is different from that of the first layer.

In a producing method of a cellulose acylate film of the present invention, at least a first solution and a second solution are prepared. In the first solution, a first material whose averaged degree of acylation is in the range of 0.5 to 2.8 is dissolved to a solvent, In the second solution a second material whose averaged degree of acylation is different from the first material is dissolved to a solvent. The averaged degree of acylation of the first and second materials are adjusted by mixing plural cellulose acylates whose averaged degrees of acylation are different. The prepared first and second solutions are cast on a substrate to form the cellulose acylate film having plural layers in which a second layer is formed on a first layer. The first layer is formed of the first solution and to be contacted to a hydrophilic material, and the second layer is formed of the second solution. The formed cellulose acylate film is peeled from the substrate, and thereafter superimposed on the hydrophilic material.

According to the invention, the cellulose acylate film is obtained without saponification in the producing method of the present invention, and the averaged degree of acylation of the cellulose acylate film is controlled by mixing the several sorts of cellulose acylates which have different averaged degrees of acylation. Accordingly, the cellulose acylate film is excellent in adhesive property and optical property. Therefore, the cellulose acylate film is used for the polarizing filter, the optical compensation film, the liquid crystal display and the like.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1A:
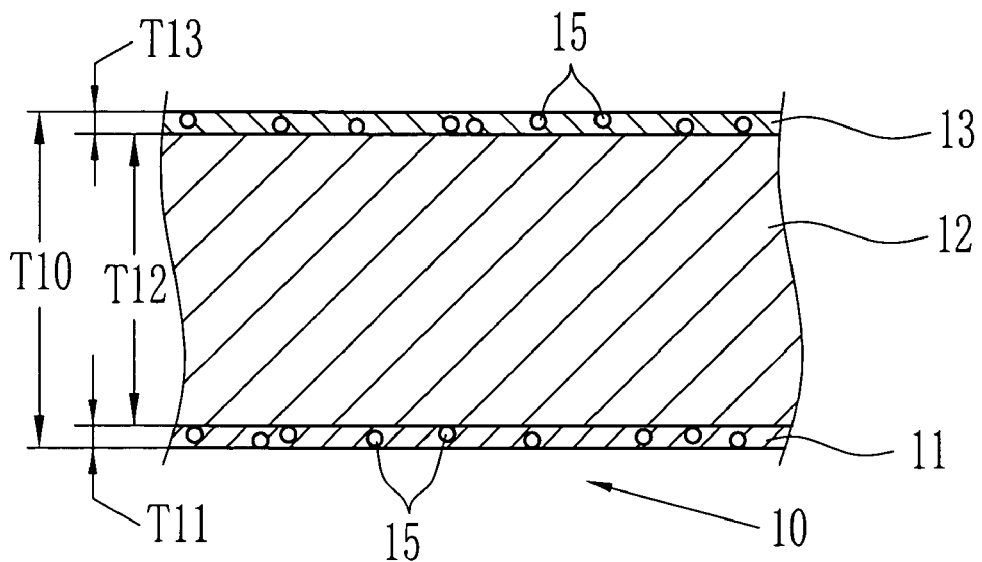
FIG. 1A is a sectional view of a cellulose acetate film of a first embodiment of the present invention.

In the embodiment of the present invention, since acetylation is made as the esterification of the cellulose acylate, the degree of acetylation is regarded as the degree of acylation, and cellulose acylate used in this embodiment is cellulose acetate. It is to be noted in the present invention that the esterification is not restricted in the acetylation, and cellulose acylate is not restricted in cellulose acetate.

As described above, the averaged degree of acetylation of cellulose acetate is usually regulated in a method of saponificating and ripening cellulose triacetate, and this method already known is applied to the present invention. In the method, cellulose made from a wood pulp or a cotton linter is processed with acetic acid or anhydride thereof, so as to obtain cellulose acetate whose degree of acetylation is three. The acetic anhydride has an effect of agent for esterification, and thereby sulfuric acid is used as the catalyst. After the esterification, the remaining sulfuric acid is neutralized, and the ripening is made in a predetermined method which is already known. Thus the cellulose acetate whose degree of acylation is regulated is obtained. The neutralization of the remaining sulfuric acid is made by adding calcium compounds, such that the content thereof may be at most 60 ppm in weight ratio to cellulose acylate. However, in the present invention, several sorts of cellulose acetate having different degree of acetylation, which are prepared in an industrial production are mixed. Thereby the ratio of the mixing is adequately set such that the degree of acetylation may be optionally adjusted to a predetermined value in the range of 0.5 to 2.8. Thus it becomes more easily and finely to control the averaged degree of acetylation than to produce many sorts cellulose acetate having different averaged degree of acetylation.

In this embodiment, in order to prepare a solution or dispersion (hereinafter dope) of cellulose acetate having predetermined averaged degree of acetylation, several sorts of cellulose acetate having different averaged degrees of acetylation are mixed and thereafter dissolved to or dispersed in a solvent. However, the preparing method is not restricted in it. For example, plural sorts of cellulose acetate having different averaged degrees of acetylation are used, and all of the averaged degrees are previously known. Then each sort of cellulose acetate is dissolved. Thus the same number of a solution or dispersion is obtained as the sorts. The plural solutions or dispersions are mixed so as to obtain the mixture as the dope cellulose acetate that has the predetermined averaged degree of acetylation.

Note that in this embodiment, a birefringence satisfies retardation values: $0 \leq Re \leq 5$, $30 \leq Rth \leq 40$. However, the value of the retardation is different depending on use of the cellulose acylate film, and the present invention does not depend on the retardation. Note that the present invention can be applied when ever the adequate optical property varies in accordance with use.

In FIG. 1A, a film 10 of the present invention has a multi-layer structure while the film of the prior art has a single-layer structure. Further the thickness of the film of the present invention is not larger than of the prior art. The film 10 is formed of a solution casting method and has a first outer layer 11 as a peeled layer from a substrate for casting. The film 10 is further provided with an inner layer 12 and a second outer layer 13 which are on the first outer layer 11 in this order. The main content of the outer and inner layers 11–13 is cellulose acetate containing additives. As the additives in the embodiment of the present invention, there are plasticizer, particles of silica ($SiO_2$) and the like, and acid compounds. However, the present invention is not restricted in them. Further, another layer may be provided between the first outer layer 11 and the inner layer 12, or between the inner layer 12 and the second outer layer 13.

Cellulose acetate of the first outer layer 11 is made from a wood pulp as a raw material, and the averaged degree of acetylation is from 1.8 to 2.8. As the additives, the silica particles 15 and the acid materials are contained. Further, cellulose acetate of the inner layer 12 is made from wood pulp as the raw material, and the averaged degree of acetylation is from 2.2 to 2.9. The additives in the inner layer 12 are a plasticizer, a UV-absorbing agent or the like.

Cellulose acetate of the second outer layer 13 is made from wood pulp, and the averaged degree of acetylation is the same value in the range of 1.8 to 2.2 as the first outer layer 11. The additive of the second outer layer 13 is the particles 15 of the silica. Further, the thickness T10 of the film 10 is at least 10 μm and at most 300 μm.

Figure 1B:
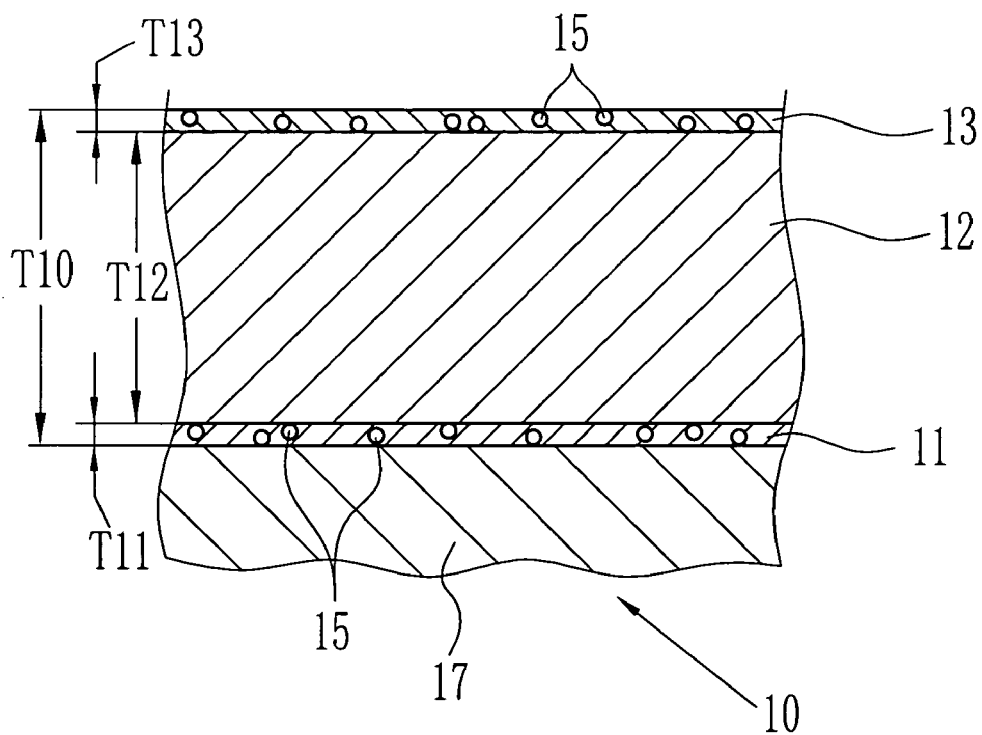
FIG. 1B is a sectional view illustrating a situation that the cellulose acetate film in FIG. LA is laminated to a hydrophilic material.

In FIG. 1B, the film 10 is laminated on a hydrophilic material 17, such that the first outer layer 11 may contact to the hydrophilic material 17. As the hydrophilic material 17, there are polyvinyl alcohol and the like In the outer layers 11, 13 as surface layers, the averaged degree of acetylation of the cellulose acetate is very low, and much lower than that in the inner layer 12. Accordingly, the adhesive properties to the hydrophilic material 17 are provided without saponification. Further, the second outer layer 13 is often laminated to another hydrophilic material. In consideration thereof, the degree of acetylation is the same between the first and second outer layers 11, 13, and the second outer layer 13 has the preferable adhesive properties to the hydrophilic material. If it is not necessary to laminate the second outer layer 13 on the another hydrophilic material, other layer may be formed on the second outer layer.

Originally, in order to satisfy the predetermined moisture permeability and the optical properties so as to use for polarizing filter and so on, the degree of acetylation of cellulose acylate to be used for the film is preferably high. However, in the present invention, the film 10 has multi-layer structure, and the first outer layer 11 to be contacted to the hydrophilic material 17 is formed as a thin layer so as to have low degree of acetylation, while the inner layer 12 is formed as a thick layer so as to have usual degree of acetylation. Thus the cellulose acylate film produced in the present invention, has the almost same optical properties as that in the prior art, and further has the adequate adhesive properties to the hydrophilic material. Therefore, it is effective to decrease the averaged degree of acetylation in the outer layers 11, 13 as the surface layers, independent of degree of acetylation of the inner layer 12 as an inner layer. Note that the averaged degrees of acetylation of the outer layers (lowest and uppermost layers) are not necessarily the same.

The degree of acetylation of cellulose acylate in the outer layers 11, 13 as the surface layers is preferably in the range of 0.5 to 2.8, particularly in the range of 1.8 to 2.2.

Further, when the degree of acetylation is lower, then the birefringence becomes larger. Accordingly, the first outer layer 11 of the lower degree of acetylation is combined with the inner layer 12 of usual degree of acetylation, so as to obtain the cellulose acylate film having the adequate optical property. In this embodiment, the first and second outer layer 13 has the same value of the lower degree of acetylation than the inner layer 12, and the inner layer 12 is sandwiched by the first and second outer layers 11, 13. Accordingly, the both surface of the film 10 has the adequate adhesive property, and the film 10 has the adequate optical properties to the hydrophilic material.

Preferably, the thickness T11 of the first outer layer 11 is in the range of 1 μm to 10 μm, the thickness T12 of the inner layer 12 is in the range of 20 μm to 100 am, and the thickness T13 of the second outer layer 13 is in the range of 1 μm to 10 μm. In order to improve the adhesive properties to the hydrophilic materials such as polyvinyl alcohol and the like, the thickness T11 of the first outer layer 11 and the thickness T13 of the second outer layer 13 may be small and not necessarily the same. Note that the thickness of each layer in the present invention is not restricted in the above ranges.

Since the degree of acetylation is in the above low value, a contact angle of the first outer layer 11 and the inner layer 12 for water is preferably at most 60°. The contact angle to water indicates the degree of affinity to water, and when the contact angle is larger than 60°, the adhesive properties to the hydrophilic materials such as polyvinyl alcohol and the like are not enough. The contact angle is particularly preferably in the range of 20° to 57°, and especially in the range of 20° to 50°. Accordingly, it is preferable to control the degree of acylation on the film surface such that the contact angle may satisfy the above range. When the esterification of other cellulose acylate is performed, it is preferable that the relation between the contact angle and the degree of acylation is previously determined. Then, based on the data thereof, it is preferable that the degree of acylation is controlled in the surface layer.

Further, in the cellulose acylate film, when the degree of acylation is lower, then the birefringence becomes larger. Accordingly, the first outer layer 11 of the lower degree of acetylation is combined with the inner layer 12 of usual degree of acetylation, so as to obtain the cellulose acylate film having the adequate optical property.

As described below, the first outer layer 11 is the peeled surface from the substrate. When the peeling is made, it is preferable that the first outer layer 11 contains acid compound whose acid dissociation constant pKa (=−log Ka) in an aqueous solution at 25° C. is in the range of 2.0 to 4.5. The reason therefor is that when the adhesive properties of the first outer layer 11 to the hydrophilic materials are improved, the adhesive property of the first outer layer 11 to the substrate becomes larger and therefore the load for peeling becomes larger. When the above acid compounds are contained in the dope, the first outer layer has enough adhesive properties to the hydrophilic materials. Therefore, the present invention is effective also in this case.

According to the acid material contained in the first outer layer 11, the acid dissociation constant pKa in the aqueous solution of 25° C. is preferably in the range of 2.0 to 4.5, and particularly 2.0 to 3.0. The acid materials may be salt. The effective acid material whose acid dissociation constant is in the range of 2.0 to 4.5 is, for example, acetic acid, lactic acid, tartaric acid, citric acid, esters of citric acid, since they are industrially usable. Single one or mixture of them may be used.

In the cellulose acylate film of the present invention, halfester form of ethyl citrate is added as the acid compound only to the first outer layer 11. The acid compounds are added in order to improve the peelability from the substrate. The hydrophilic property of the first outer layer 11 which adheres to the substrate is improved. This improvement enlarges the adhesive properties of the film to the substrate. In this case, the peel force for the peeling from the substrate becomes larger. However, as the acid materials are added, the peeling of the film from the substrate is made stably. Thus the film can be produced continuously and stably. Accordingly, the above acid compounds may contained in a contact surface of the first outer layer 11 to the substrate in performance of the peeling, and it is not necessary that the acid compounds remain in the contact surface or is dispersed in the first layer 11 after the peeling. However, it is hard to control such that the acid compounds may be contained only in the contact surface of the first outer layer 11 to the substrate. Therefore, in the present invention, they are contained in the first outer layer 11. In the present invention, as described above, the adhesive property to the hydrophilic material is increased by regulating the degree of acetylation, and the peelability from the substrate is regulated by adding the acid compound. Note that while the acid compounds have no effects for increasing the adhesive property, the adhesive property is increased dependent on the degree of acetylation.

In order to improve the peelability from the substrate, other groups may be substituted for the hydroxilic group in the cellulose acylate. However, in view of the adhesive property to the hydrophilic material as the object of the present invention, it is preferable that the hydroxylic groups remain in the cellulose acylate. Accordingly, it is preferable in the present invention that the acid materials are added. However, when the content of the added acid materials is high, the film is easily deteriorated. It is preferable in this embodiment that the acid material is contained only in the first outer layer, namely the layer contacting to the substrate that the dope is cast to form. The ion equivalent of the added acid materials in the dope for forming the first outer layer 11 is the same as that of the alkali ion or the alkali earth ion. Note that the addition of the acid materials to the first outer layer does not substantially decrease the adhesive properties to the hydrophilic materials 17.

The halfester form of ethyl citrate is a mixture of several types of esters of citric citrate, while the degree of substitution of hydroxyl groups for ethoxy groups is different among the molecules of the several types. The averaged acetylation ratio is determined as an average of acetylation ratios of the total ethyl citrates. Note that, when the ethoxy groups are substituted for all of the hydroxyl groups, The averaged acetylation ratio is 100%. In the halfester form of ethyl citrate, the averaged acetylation ratio is 50%.

Further, in the present invention, only the inner layer of the multi-layer structure of the cellulose acylate film can contain the inner layer contain the emission compounds. The emission compound is the compound that does not stay in one layer but transmits from the one layer to another layer or to an outside, and usually has low molecular weight, for example, the sublime compounds or the volatile compounds which becomes from a solid or liquid state to a gas state. In this embodiment, the plasticiser as the emission compound is added only to the inner layer 12 as the inner layer, and not to the outer layers 11, 13 as the surface layers. Thus in the film production process, the speed of the plasticiser for dispersing on the film surface is decreased so as to reduce the emission and to prevent the pollution in process.

Further, the particles of silica and the like are usually added for improvement of the lubricant property of the film. In the present invention, the particles 15 are not added to the inner layer 12, but only to the outer layers 11, 13 as the surface layers. When the content of such particles is too large, the optical transmittance of the film becomes lower extremely. Therefore, it is preferable that the content of the particles is as small as possible. In the present invention, the film 10 has multi-layer structure, which is different from the film of the prior art that has single layer structure. Accordingly, there is a merit in that the distribution of addition of the particles can be controlled. Thus the lubricant property of the prior art is kept in the present invention, the decrease of the transmittance of the film is prevented, and the cost for production becomes lower, as the total content of the particles becomes smaller. Note that the particles added for providing lubricant property are $SiO_2$. However, the present invention is not restricted in it.

Figure 2:
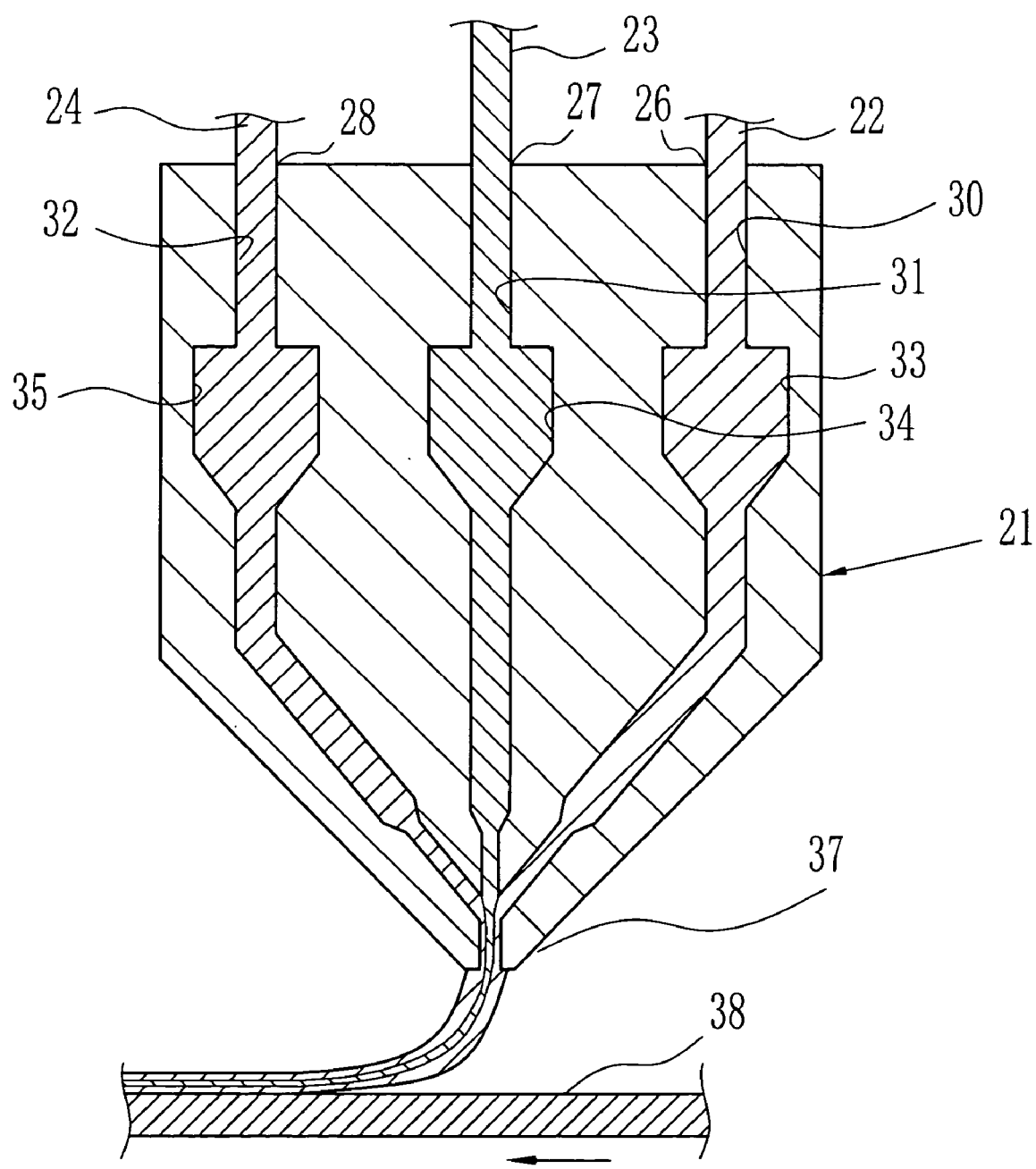
FIG. 2 is a sectional view of a casting die of multi-manifold type.

In FIG. 2, a casting die 21 is a multi-manifold type, so as to simultaneously form three layers illustrated in FIG. 1. The outer layers 11–13 in FIG. 1 are respectively formed from dopes 22–24, and these are supplied by a dope supplying device (not shown) for the casting die 21. On a rear surface of the casting die 21, respective dope supply openings 26–28 for the dopes 22–24 are formed. The three types of the respective dopes 22–24 are temporary retained in pockets 33–35 provided on slots 30–32, and cast from a die lip 37 of the casting die 21 onto a band 38 as the substrate. Close to the die lip 37, the slots 30–32 are joined, and the three dopes are simultaneously cast to form multi-layer structure. This method of casting is generally called a co-casting method. Further, the substrate is not restricted in the band 38 but may be a drum.

Further, in the film production process, the extrusion pressure applied to the dope 22–24 is independently controlled. Thus the thickness of each layer is optionally adjusted. In order to control of the thickness of each layer, there is a method for adequately determining a slot width in the joining section of the slots as passages of three dopes, and a method for adjusting the extrusion pressure applied to the dopes.

Note that the position of the dope supply openings 26–28, formation of the slots 30–32, formations of pockets 33–35, and a structure of the joining section of slots close to the lip 27 of the casting die 21 are not restricted in the above embodiment, but may be a casting die of general multi-manifold type for co-casting. When the casting die can simultaneously form N layers (N is a natural number at least 2), the number of the slots (or passages) of the dopes is N, and the fundamental structure thereof is the same as the above description.

Figure 3:
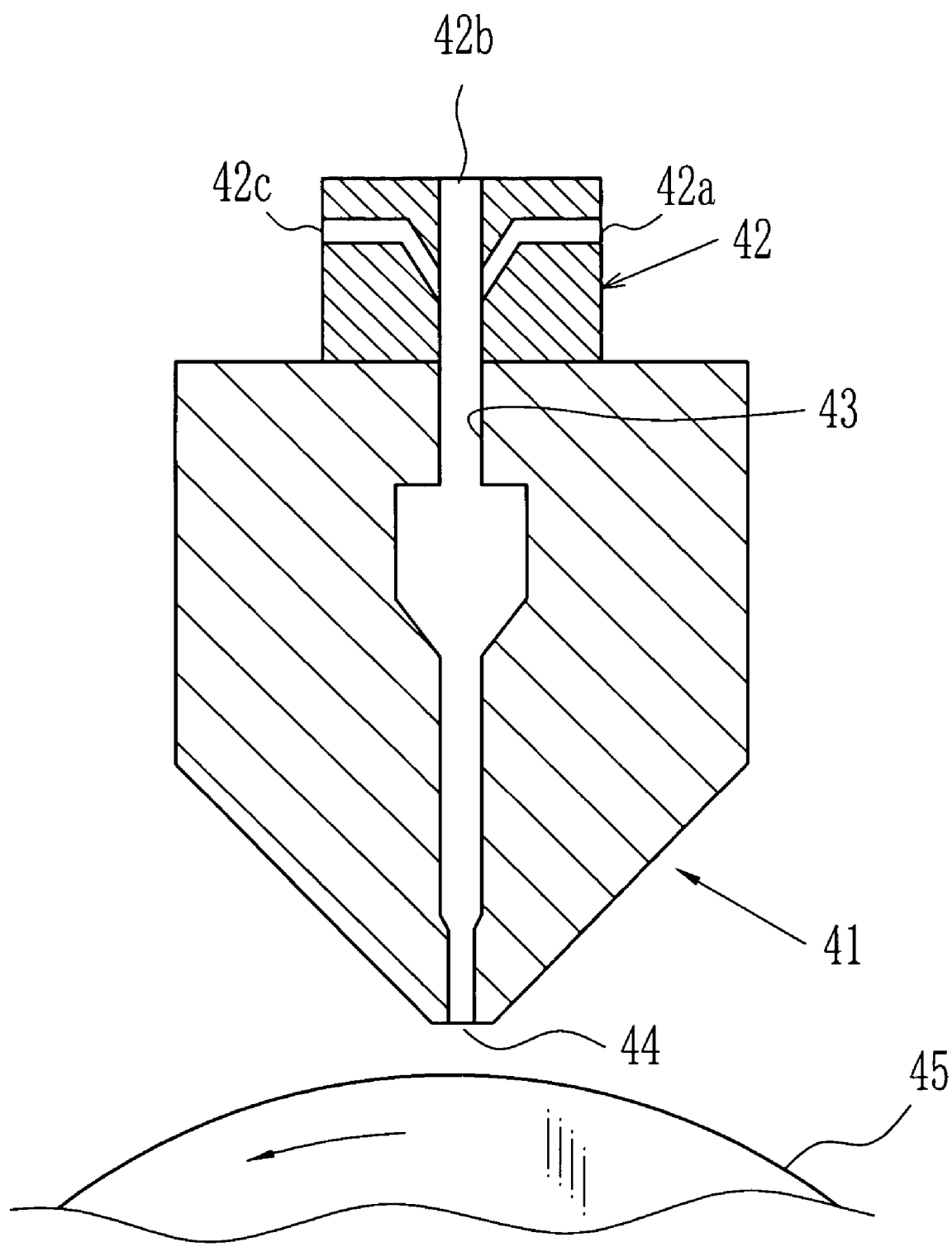
FIG. 3 is a sectional view of a casting die of a feed-block type.

In FIG. 3, a casting die 41 is a feed block type having a single slot. As the multi-manifold type of the casting die in FIG. 2, the casting die 41 can form the film 10 having the multi-layer structure constructed of the three layers 11–13 in FIG. 1. The rear surface of the casting die 41 is provided with a feed block 42 having supply openings 42a–42c. Through the supply openings 42a–42c, the dopes 22–24 (See, FIG. 2) for forming the outer layers 11–13 are respectively supplied in the feed block 42. In the feed block 42, the respective slots extending from the supply openings 42a–42c are joined such that the three dopes 22–24 flows in one passage to have three layer structure. Then the dopes 22–24 are supplied in the casting die 41 to pass through a single slot 43, and simultaneously cast from the lip 44 onto a drum 45 as the substrate. Further, the substrate is not restricted in the drum 45 but may be the band 38 (see, FIG. 2).

Further, in the present invention, the dopes may be cast in a co-casting method in combination of the multi-manifold type of FIG. 2 and the feed block type of FIG. 3. Also in this case, the substrate may be the band 38 in FIG. 2 or the drum 45 in FIG. 3.

In the present invention, the dopes may be not cast in the co-casting method but in a method of sequentially casting. When the N layers are formed in the method of the sequential casting, the dopes can be cast on the substrate with a casting number NC (NC is determined as a natural number of at least 2) which satisfies a condition of $2 \leq NC \leq N$. When NC<N, then it is necessary to perform the co-casting at least one time in a dope casting process. Preferably, the substrate is the band in the method of sequentially casting.

As the solvent used for the dopes 22–24 is halides of organic compound (dichloromethane, dichloromethylene and the like), and non-chlorified compounds such as alcohols (methylalcohol, ethylalcohol, n-butylalcohol and the like), several sorts of compound having ester form (methyl acetate, ethyl acetate and the like) and the like. Accordingly, the present invention is made with consideration of circumstances.

Figure 4:
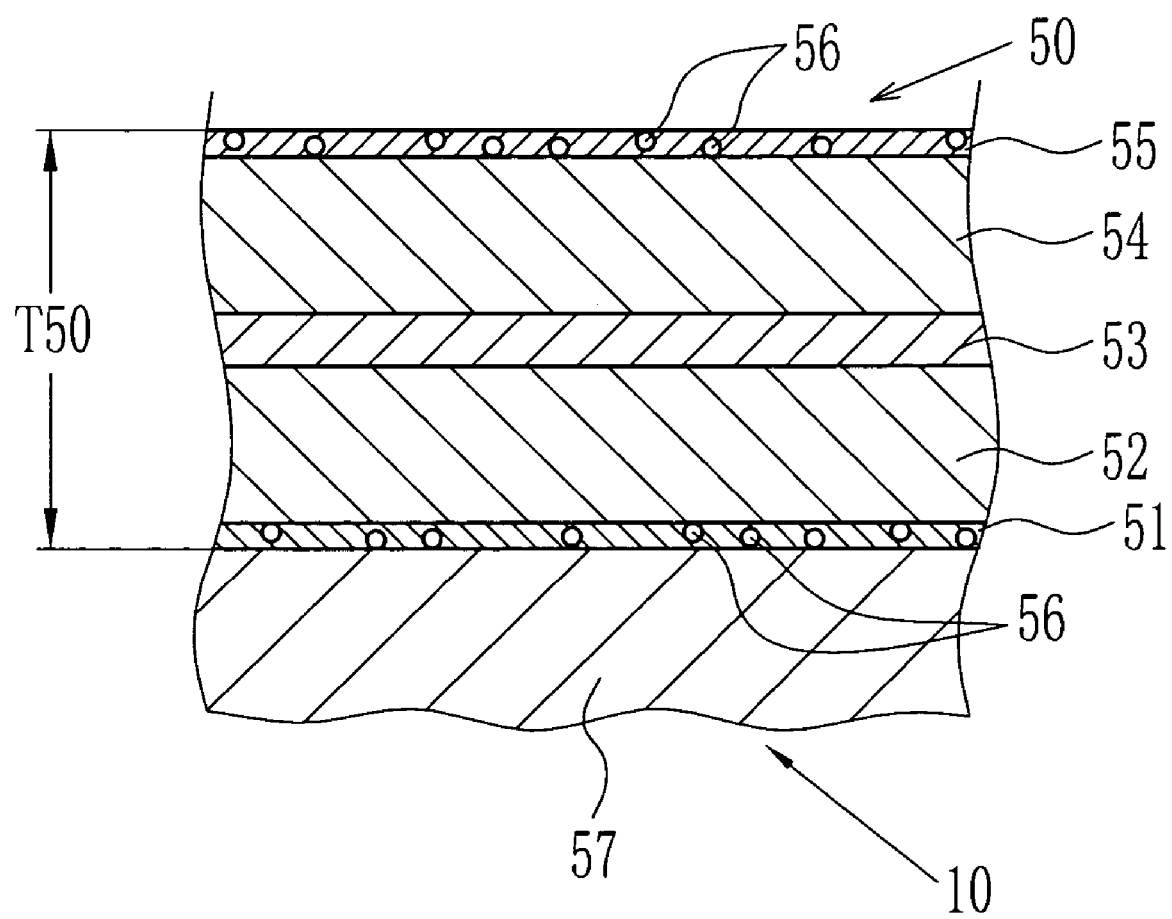
FIG. 4 is a sectional view of a cellulose acetate film of a second embodiment of the present invention.

In FIG. 4, a cellulose acylate film 50 of the present invention has a multi-layer structure as FIG. 1 while the film of the prior art has a single-layer structure. The number of the layer of the film 50 is 5. The film 50 has a first outer layer 51 as a peeled layer from the substrate, and is further provided with first-third inner layers 52–54 and a second outer layer 55, which are overlaid on the first outer layer 51 in this order. Further, the film 50 is laminated on a hydrophilic material 57. Furthermore other layers may be formed between the layers 51–55. The main raw material of these layers 51–55 is one of wood pulp and cotton linter in this embodiment. It is to be noted in the present invention that at least one of the plural layers may be made from a mixture of materials made from the wood pulp and the cotton linter. The thickness T50 of the film 50 is in the range of 10 μm to 300 μm.

The raw material of cellulose acetate of the first outer layer 51 is cotton linter, and the averaged degree of acetylation is in the range of 1.8 to 2.2. As the additive, the particles 56 of silica and the acid materials are contained in the first outer layer 51. Further, in the first inner layer 52 and the third inner layer 54, the raw material of the cellulose acetate is wood pulp, and the averaged degree of acetylation is in the range of 2.2 to 2.9. In the second inner layer 53, the raw material of cellulose acetate is wood pulp and the averaged degree of acetylation is in the range of 1.8 to 2.2. The additives of the first-third inner layers 52–54 are the plasticizer and the UV-absorbing agent and the like. Further, the raw material of the second outer layer 55 is wood pulp, and the averaged degree of acetylation is in the range of 1.8 to 2.2. Note that the thickness T50 of the film 50 is in the range of 10 μm to 300 μm.

The degree of acetylation of cellulose acetate of the outer layers 51, 55 as the surface layers is extremely low and much lower than that of the inner layers 52–54. Accordingly, the adhesive properties to the hydrophilic materials such as polyvinyl alcohol and the like are provided to the film 50 without saponification. The second outer layer 55 is often laminated to another hydrophilic material. In consideration thereof, the degree of acetylation is the same between the first and second outer layers 51, 55, such that the second outer layer 55 may have the preferable adhesive property to the hydrophilic material. The degree of acetylation is determined in accordance with the sort of the another hydrophilic material. Note that the averaged degrees of acetylation of the first outer layer (lowest layer in FIG. 4) 51 and the second outer layer (uppermost layer in FIG. 4) 55 are not necessarily the same.

By the way, when the degree of acylation is lower, then the optical anisotropy becomes larger. Accordingly, the layer of the lower degree of acylation is combined with the layer having the higher degree of acylation, so as to obtain the cellulose acylate film having the predetermined birefringence. For example, the averaged degree of acylation in the first and second outer layers 51, 55 and the second inner layer 53 is higher than that in the first and third inner layers 52, 54. Thus in the present invention, the layer having higher averaged degree of acylation is combined with that having lower one, such that the optical properties of the produced film are improved. Further, the layers having higher averaged degree of acylation sandwich that having lower one, such that the both surface of the film 50 has the adequate adhesive property to the hydrophilic material, and the optical properties of the produced film are improved more over.

Note that the optical properties have a relation to the viewing angle properties which are important to the liquid crystal display and the like, and mean birefringence.

Further, as the first outer layer 51 is formed of cellulose acetate made from the cotton linter, the peelability from the substrate and the optical properties are improved. There is a difference of the optical properties between cellulose acylate made from the cotton linter and that from the wood pulp. Therefore, it is effective to select the type of the cellulose acetate depending on the purpose. Especially cellulose acetate made from the cotton linter is much more excellent in the peeling property from the substrate than that from the wood pulp. Therefore the first outer layer 51 can be peeled with low peel force. As the acid compound, the halfester form of ethyl citrate with ethanol is added to stabilize the peelability moreover. In the present embodiment, the particles 56 of silica are added to the outer layers 51, 55 as the surface layers such that the film 50 has lubricant property. Accordingly, it is not necessary to add the particles 56 to the inner layers 52–54 as inner layers.

It is preferable that the at least one layer is made from only the cotton liner, or the main raw material therefor is the cotton linter. Since the substance made from the cotton linter is expensive, it is preferable to form other layers from the substances made from wood pulp. Accordingly, in the multi-layer structure, the surface layer forming a peeled surface from the substrate is formed of a cotton linter, and at least another layer is formed from the wood pulp.

Note that the raw material of each outer and inner layer 51–55 is not only one of the cotton linter and the wood pulp but may be mixture. It is effective to form the layers by adequately mixing the both cellulose acetate, in consideration with necessity of fine control to the properties and characters of the film, such as optical properties and the peelability from the substrate and a cost of production. For example, the layer constructing the peeled surface may be formed of the mixture of the both cellulose acetate when the predetermined peelability from the substrate is obtained. Thereby the mixing ratio of both cellulose acylate is determined, depending on the speed of the film production and the content of the solvent in peeling the film from the substrate. Further, in order to control the property of the film finely, it is effective to provide the at least one and preferably plural layers in which several sorts of the raw material are mixed.

In this embodiment, the plasticizer is added to the inner layers 52–54 as the inner layers, and not added to the outer layers 51, 55 as the surface layer. Thus the emission is reduced and the pollution of the process is prevented. Note that when the number of the layer is at least 4, the layer to which the emission compounds such as the plasticizer are not added is not restricted only in the surface layer, and the emission compounds may not be added to at least the surface layer.

In the above embodiment, it is preferable that the outer layers 51, 55 as the surface layers are thin. The large thickness of the layers which does not contain the plasticizer decreases the mechanical strength of the film, such as the tension strength and the bending strength. Otherwise, when the cellulose acetate layer of extremely low degree of acetylation is thick, the film has large moisture absorption and water absorption. In the latter case, the condition of the film loses the stableness, which often causes the deformation, such as curl and the like. The thickness of the surface layer is in the range of 1 μm to 50 μm, and preferably in the rang of 1 μm to 10 μm.

Figure 5:
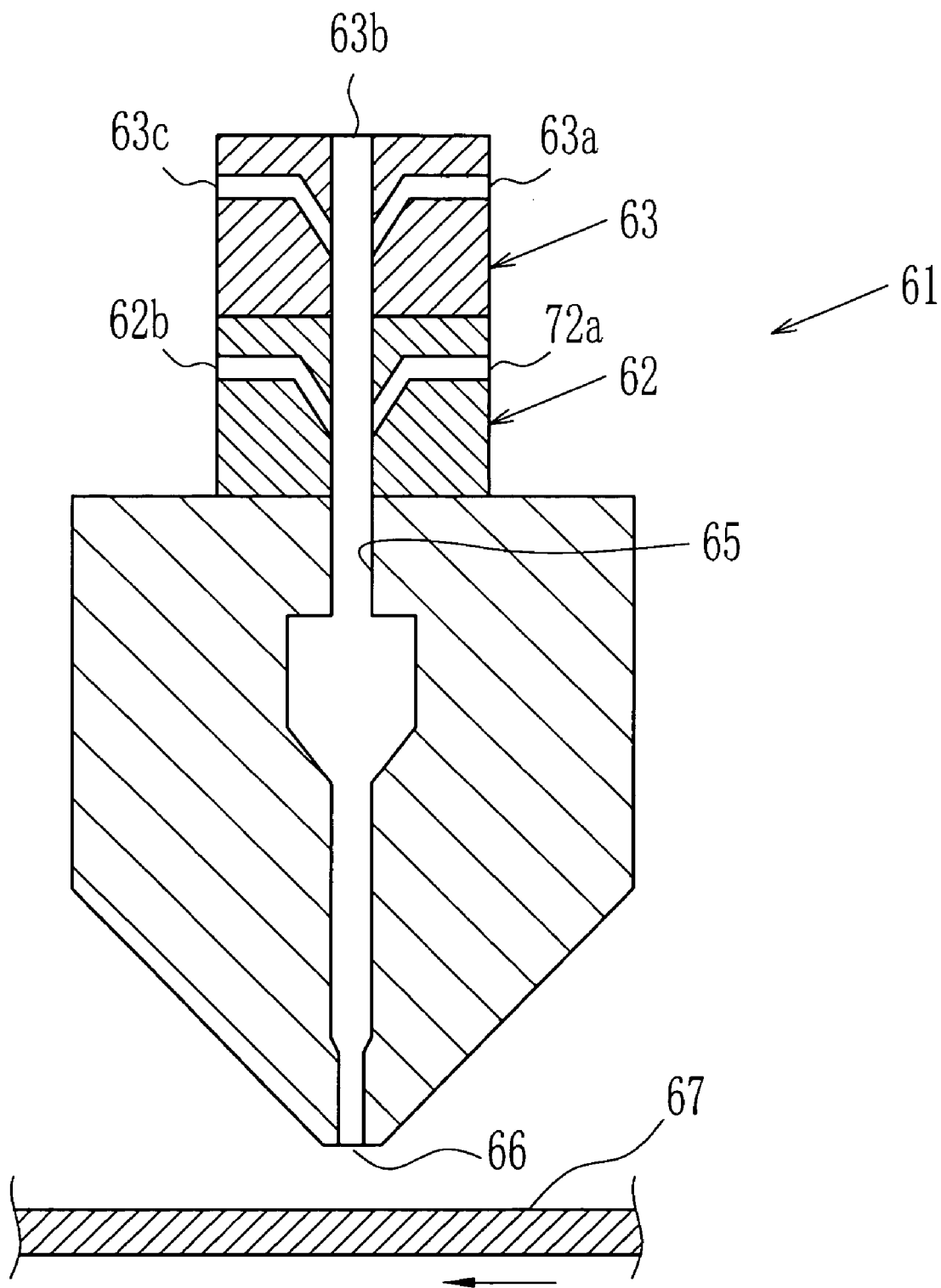
FIG. 5 is a sectional view of another embodiment of a casting die of a feed-block type.

In FIG. 5, a casting die 61 is used for forming the cellulose acetate film 50 having five-layer structure in FIG. 4. The casting die 61 has a single slot 65 and is a feed block type so as to form five layers simultaneously. Two feed blocks 62, 63 are piled on the rear surface of the casting die 61, and have dope supply openings 62a, 62b, 63a–63c. The dopes (not shown) for forming the outer and inner layers 51–55 (See, FIG. 4) are respectively supplied through the supply openings 62a, 62b, 63a–63c. In the feed block 63, the slots extending from the supply openings 63a–63c join to a single slot, and in the feed block 62, the single slot and the slots extending from the supply openings 62a, 62b join. Thus the five dopes form a five layer structure in the slot 65, and are cast from a lip 66 on a drum 67 as the substrate. Further, the substrate is not restricted in the drum 67, and may be the band 38 (see, FIG. 2).

Especially preferably, cellulose acylate of the present invention is cellulose acetate, but may be several sorts of cellulose acylate. Further, single one or mixture of them may be used in the present invention. The polymer is not restricted in cellulose acylate. The present invention can be applied to the case that the degree of acylation as a substitution of the acyl group for the hydroxyl group can be controlled in the polymer, and especially to the case that the polymer has no optical anisotropy and can be used for the solution casting method.

The present invention is especially effective for forming the film having not only at most 5 layers as illustrated in FIGS. 1 and 4, but at most 20 layers. The film has preferably 3–15 layers, and particularly 3–10 layers. The present invention is adequately applied when the cellulose acylate film having these multi-layer structure has the thickness of 10 μm-300 μm. However, the distribution of the thickness of each layer is not restricted. When the film has at least three layers structure, the film may not be symmetrical to the center of the multi-layer structure between the front and rear surfaces.

Further, different from the single layer structure in the prior art, the cellulose acylate film in the present invention has the multi-layer structure, and all layers of the multi-layer structure may not be formed of cellulose acylate. The other materials of some layers are selected so as to prevent the damage of the properties for optical use of the cellulose acylate film. Further, when the cellulose acylate film and other films are stacked to form a stacked film sheet, the cellulose acylate film may form the surface or the inner films of the stacked film sheet. When the cellulose acylate film is disposed inside of the stacked film sheet, the other films on the both sides of the cellulose acylate film may have a single or multi-layer structure which is symmetrical or asymmetrical to the inner cellulose acylate film.

Further, the neighboring layers may be formed of cellulose acylate having the same degree of acetylation, when there is a difference in sorts or composition of the solvents of dopes for the layers or in the sorts or amount of the additives or whether the additives are added or not. In this case these neighboring layers are regarded as the two different layers.

When the obtained cellulose acylate film is laminated on the hydrophilic material or other materials, the lamination is made in known methods. For example, there are a method of press laminating or press sealing of the film to the hydrophilic material, a method of adhesion with an adhesive agent, or a method in which cellulose acylate solution is directly applied to the hydrophilic material as an application substrate. In the application, the plural layers are formed so as to construct the cellulose acylate film on the application substrate in the present invention, while only the single layer is formed so as to construct the cellulose acylate film on the application substrate in the prior art. In this case, as described above, the casting dies of the multi-manifold type, the feed-block type, or other several types that are already known may be used for casting. Further, in the adhesion with the adhesive agent, for example, there is a case that a PVA film is used as a polarized film for the polarizing filter, and the adhesive agent to be applied to the polarized film is often the hydrophilic material. In this case, when the film of the present invention is used, the adhesive property of the film to the adhesive agent can be improved. Note that when the it is designated to use the PVA film as the polarized film, the PVA solution is used as the adhesive agent. Accordingly, the hydrophilic material of the present invention is not restricted in film, sheet, plate and so on, and may contain the adhesive agent.

Further, in the present invention, the film produced in the solution casting method is used as elements for a polarizing filter, an optical compensation film and a liquid crystal display. Further, the film is used as a photo sensitive material. In order to obtain the polarizing filter, the cellulose acetate films 10, 40, 50 produced in the solution casting method of the above embodiment are adhered as the protective films to both surfaces of a polarized film formed of a polyvinyl alcohol based (PVA) film. The polarized film is obtained by dying the polyvinyl alcohol based film. The dying method is usually a gas or liquid phase adsorption, and the both methods can be applied. In the present invention, the film is dyed in the method of liquid phase adsorption.

When the dying is performed in the method of liquid phase adsorption, iodine is used. However, the present invention is not restricted in it. The polyvinyl alcohol film is dipped for 30–5000 seconds in the aqueous solution of iodine/potassium iodide (KI). Preferably, the concentration of iodine in the aqueous solution is 0.1 g/litter to 20 g/litter, and that of the potassium iodide is 1 to 100 g/litter. Further, the temperature of the aqueous solution, while the polyvinyl alcohol is dipped, is set to 5 to 50° C.

The method of liquid phase adsorption is not restricted in the dipping method, and may be known methods, such as a method in which iodine or other dying solution is applied or sprayed to the polyvinyl alcohol film. The dying is performed after or before tensing the polyvinyl alcohol film. However, since the polyvinyl alcohol swells suitably in the dying so as to be easily tensed, it is preferable that the dying process is provided before the tensing process.

Instead of the iodine, the dichroic dye is preferably used for dying. As the dichroic dye, there are dye compounds, such as azo dyes, stilbene dyes, pyrazolon dyes, triphenylmethane dyes, quinoline dyes, oxazin dyes, thiadine dyes, anthraquinone dyes, and the like. Note that the dying compounds soluble to water is especially preferable. Further, the dichroic dye preferably has hydrophilic groups, such as sulfuric acid group, amino group, and hydroxyl group or the like.

Compounds for cross-linking the polyvinyl alcohol is used in a process of producing the polarized film by tensing the dyed polyvinyl alcohol based film. Concretely, the polyvinyl alcohol based film is dipped in a solution of cross-linking agent before or in the tensing process so as to contain the cross-linking agent in the film. Instead of dipping, the applying may be made. When containing the cross-linking agent, the polyvinyl alcohol based film is enough hardened. As the result, the polyvinyl alcohol based film is provided with the adequate orientation. Note that the especially preferable cross-linking agent of the polyvinyl alcohol is boric acids, but the sort of the cross-linking agent is not restricted in them.

The adhesive agent for the obtained polarized film and the cellulose acetate film can be used several sorts of already known compounds with which the protective films can be adhered to the polarized film. Especially preferable are boron compounds and polyvinyl alcohol based polymers containing modified polyvinyl alcohol having acetoacetyl group, sulfonic acid group, carboxyl group, oxyalkyrene group and the like. Preferably, the adhesive agent after the drying has the thickness of 0.01 to 10 μm, particularly 0.05 to 5 μm. Further, anti-reflection layer, antiglare layer, lubricant layer, easy adhesive layer can be provided on a surface of cellulose acetate film which is attached as the protective film to the polyvinyl alcohol film.

Further, an optical compensation sheet is applied to the cellulose acetate film such that the cellulose acetate film may be used as the obtained optical compensation film. When the antireflection layer is formed on the polarizing filter, the antireflection film is obtained and used as one of two surface of the protective films, so as to use in the liquid crystal display of transmissive type, reflective type, or transflective type, such as twisted nematic (TN), super twisted nematic (STN), vertical alignment (VA), in plain switching (IPS), optically compensated bend cell (OCB) and the like. Further, the optical compensation film (such as wide view film for widening the view angle of the liquid crystal display) and the birefringence filter may be combined with the film of the present invention. When the film of the present invention is used in the liquid crystal display of the transmissive type or the transflective type, the brightness enhancement film (film of polarization splitter having a layer of polarization selecting, for example D-BEF produced by Sumitomo 3M Ltd.) in the market is simultaneously used. Thus the produced liquid crystal display has high visibility.

EXAMPLES

Examples of the present invention are concretely explained. However, the present invention is not restricted in them.

Example 1

In Example 1, the cellulose acetate film 10 having the three-layer structure is produced, and the adhesive property to the polyvinyl alcohol is evaluated. The film 10 is formed in a co-casting method of feed block type so as to have the first outer layer 11 of 18 μm, the inner layer 12 of 4 μm, the second outer layer 13 of 18 μm, and the total thickness T10 of 40 μm. As the substrate, the band 38 is used. The cellulose acetate of the outer layers 11, 13 is made from wood pulp and has the averaged degree of acetylation of 2.8, and that of the inner layer 12 is made from wood pulp and has the averaged degree of acetylation 1.8. The outer and inner layers 11–13 are formed from the dopes 22–24. A mixture solvent used for the dopes 22–24 is prepared by mixing dichloromethane, methyl alcohol, n-butylalcohol in volume ratio of 85:12:3. The solid materials (containing the additives) added to the mixture solvent and the content thereof are shown in followings. Note that the plasticizer is the mixture of the triphenyl phosphate (TPP) and the biphenyl diphenyl phosphate (BDP) in the weight ratio of 3:1. The surface of the first outer layer is saponificated and then the polyvinyl alcohol is adhered to the surface. In order to adhere the polyvinyl alcohol, the aqueous solution of the modified polyvinyl alcohol is prepared and the applying thereof is made.

| (First Outer Layer) | |
|---|---|
| cellulose acetate | 19 pts. wt. |
| silica particle | 0.13 pts. wt. |
| citric acid | 300 ppm (to cellulose acetate) |
| (Inner layer) | |
| cellulose acetate | 19 pts. wt. |
| plasticizer | 16 pts. wt. |
| UV-absorbing agent | 2 pts. wt. |
| (Second Outer Layer) | |
| cellulose acetate | 19 pts. wt. |
| silica particles | 0.13 pts. wt. |

In order to evaluate the adhesive property of cellulose acetate and polyvinyl alcohol, they are adhered and thereafter dipped into a warm water of 60° C. for 10 hours. Then the condition of peeling the cellulose acetate film from the polyvinyl alcohol is observed with human eyes. In evaluation of the dimensional resistance, the cellulose acetate film is disposed in the atmosphere of 90° C. for 120 hours, and thereafter the change of size of the cellulose acetate film is measured. The peelability from the substrate is evaluated by measuring the peel force.

As the result of examination of Example 1, the retardation in thickness direction Rth of the obtained cellulose acetate film is 40 nm, and therefore extremely preferable for optical use. The combination of the polymer film and the polyvinyl alcohol is excellent in adhesive property, dimensional resistance and peelability from the substrate.

Example 2

In Example 2, the cellulose acetate film 50 having the five-layer structure in FIG. 4 is produced, and the adhesive property to the polyvinyl alcohol is evaluated. The film 50 has the outer layers 51,55 of 3 μm, the first and third inner layers 52,54 of 15 μm, the second inner layer 53 of 4 μm in thick. The cellulose acetate of the first-third inner layers 52–54 and the second outer layer 55 is made from wood pulp, and only that of the first outer layer 51 is made from cotton linter. The degree of acetylation in the outer layers 51,55 is 1.8, that in the first and third inner layers 52, 54 is 2.8, and that in the second inner layer 53 is 2.75. The mixing ratio of the solid materials and the additives, which are added to the dope for each layer, are as follows. The cellulose acylate film is adhered to the polyvinyl alcohol without saponification of surface of the first outer layer 51. Other conditions, such as sorts of plasticizer and particles, the evaluation method and the like, are the same as in Example 1.

| (First Outer layer) | |
|---|---|
| cellulose acetate | 19 pts. wt. |
| silica particle | 0.13 pts. wt. |
| citric acid | 300 ppm (to cellulose acetate) |
| (First Inner Layer) | |
| cellulose acetate | 19 pts. wt. |
| plasticizer | 16 pts. wt. |
| UV-absorbing agent | 2 pts. wt. |

-continued (Second Inner Layer)

| | |
|---|---|
| cellulose acetate | 19 pts. wt. |
| plasticizer | 16 pts. wt. |
| UV-absorbing agent | 2 pts. wt. |

(Third Inner layer)

| | |
|---|---|
| cellulose acetate | 19 pts. wt. |
| plasticizer | 16 pts. wt. |
| UV-absorbing agent | 2 pts. wt. |

(Second Outer Layer)

| | |
|---|---|
| cellulose acetate | 19 pts. wt. |
| silica particle | 0.13 pts. wt. |

As the result of examination of Example 2, the retardation in thickness direction Rth of the obtained cellulose acetate film is 40 nm, and therefore extremely preferable for optical use. The combination of the cellulose acylate film and the polyvinyl alcohol film is excellent in adhesive property, dimensional resistance, and peelability from the substrate.

(Comparison 1)

In Comparison 1, cellulose acylate whose averaged degree of acylation is 2.8 is used for forming a film having a single layer structure and thickness of 40 μm. The raw material of cellulose acetate is wood pulp. The mixing ratio of the solid material in the dope is as follows. Other conditions, such as sorts of solvent, the evaluation method and the like, are the same as in Example 1. Note that the saponification is made on the surface which is peeled from the substrate.

| | |
|---|---|
| cellulose acetate | 19 pts. wt. |
| silica particle | 0.13 pts. wt. |
| plasticizer | 16 pts. wt. |
| UV-absorbing agent | 2 pts. wt. |

As the result of examination of Comparison 1, the combination of the polymer film and the polyvinyl alcohol is excellent in adhesive property, dimensional resistance, and peelability from the substrate. However, the retardation in thickness direction Rth of the obtained cellulose acetate film is 24 nm, which is not adequate for optical use.

(Comparison 2)

In Comparison 2, cellulose acylate whose averaged degree of acylation is 2.7 is used for forming a film having a single layer structure and thickness of 40 μm. The raw material of cellulose acetate is wood pulp. The mixing ratio of the solid material in the dope is as follows. Other conditions, such as sorts of solvent, the evaluation method and the like, are the same as in Example 1. Note that the saponification is made on the surface which is peeled from the substrate.

| | |
|---|---|
| cellulose acetate | 19 pts. wt. |
| silica particle | 0.13 pts. wt. |
| plasticizer | 16 pts. wt. |
| UV-absorbing agent | 2 pts. wt. |

As the result of examination of Comparison 1, the retardation in thickness direction Rth of the obtained cellulose acetate film is 39 nm, and therefore preferable. The combination of the polymer film and the polyvinyl alcohol is excellent in adhesive property and dimensional resistance. But the peelability from the substrate is not good.

Example 3

In Example 3, the polyvinyl alcohol film (produced by Kuraray Co. Ltd) whose thickness is 75 μm is dipped in an aqueous solution at 25° C., in which the content of the iodine is 0.3 g/litter and that of potassium iodide is 18.0 g/litter. Thereafter the film is tensed in an aqueous solution at 50° C., in which the content of boric acid is 80 g/litter and that of potassium iodide is 30 g/litter. Thus the film becomes five times larger to the polarized film. The cellulose acetate film obtained in Example 2 is adhered to the polarized film with the adhesive agent, and thereafter they are dried for 30 minutes in thermostatic chamber in which the temperature of air is kept at 80° C. Note that the adhesive agent is a 4% aqueous solution of polyvinyl alcohol (trade name; PVA-117H, produced by Kuraray Co. Ltd.).

According to the obtained polarizing filter, a parallel transmittance Yp and a crossed transmittance Yc in the visible range is obtained with a spectrophotometer, and the polarizing coefficient PY is calculated on the basis of the following formula:

$$PY=\{(Yp-Yc)/(Yp+Yc)\}^{1/2} \times 100 \, (\%)$$

As the result of examination of Example 3, the polarizing coefficient PY of any polarizing filter constructed of the film produced in Example 2 is at least 99.6%. The film obtained in the solution casting method of the present invention is adequately used for the polarizing filter.

Example 4

The polarizing filter produced in Example 3 is used as the polarizing filter in a screen side of the transmissive type of TN liquid crystal display provided in a note type personal computer. This liquid crystal display has the polarization splitter film (trade name; D-BEF, produced by Sumitomo 3M Ltd.) between a back light and the liquid crystal cell.

As the result of examination of Example 4, in the obtained liquid crystal display, the reflection of background is extremely reduced, and the quality of image is very high. The film obtained in the solution casting method of the present invention is adequately used for the liquid crystal display.

Various changes and modifications are possible in the present invention and may be understood to be within the present invention.

What is claimed is:

1. A cellulose acylate film comprising:
   plural layers of cellulose acylate including two surface layers and at least one inner layer;
   wherein the average degree of acylation of cellulose acylate in said two surface layers is in the range of 0.5 to 2.8 and the average degree of acylation of cellulose acylate in said inner layer is higher than that of said two surface layers.

2. A cellulose acylate film as claimed in claim 1, wherein one of said two surface layers is stacked on a hydrophilic material.

3. A cellulose acylate film as claimed in claim 2, wherein the average degree of acylation of said cellulose acylate in each layer is adjusted by mixing plural cellulose acylates having different average degrees of acylation.

4. A cellulose acylate film as claimed in claim 2, wherein in order to regulate the average degree of acylation of said cellulose acylate, cellulose as a component of said cellulose acylate is esterified by use of acetic acid and acetic anhydride using sulfuric acid as a catalyst, and the remaining sulfuric acid is neutralized, and thereafter ripening is performed.

5. A cellulose acylate film as claimed in claim 4, wherein the neutralization of said remaining sulfuric acid occurs by use of calcium compounds, and the content of said calcium compounds to said cellulose acylate in weight ratio is at most 60 ppm.

6. A cellulose acylate film as claimed in claim 2, wherein the contact angle to water on outer surfaces of said surface layers is at most 60°.

7. A cellulose acylate film as claimed in claim 2, wherein at least one of said cellulose acylate, additives, and solvents is different between any adjacent two of said plural layers.

8. A cellulose acylate film as claimed in claim 2, wherein said plural layers are formed by performing a solution casting of plural solutions, such that one of said solutions for said two surface layers may contact a substrate.

9. A cellulose acylate film as claimed in claim 8, wherein said one surface layer contacting said substrate contains an acid compound when peeled from said substrate, and said acid compound has an acid dissociation constant pKa in the range of 2.0 to 4.5 in an aqueous solution at 25° C.

10. A cellulose acylate film as claimed in claim 2, wherein at least one of said plural layers is comprised of cellulose acylates made from wood pulp, and remaining layers are comprised of cellulose acylates made from cotton linter.

11. A cellulose acylate film as claimed in claim 2, wherein at least one of said plural layers is comprised of a mixture of a cellulose acylate made from wood pulp and a cellulose acylate made from cotton linter, and remaining layers are comprised of cellulose acylates made from said cotton linter.

12. A cellulose acylate film as claimed in claim 2, wherein said inner layer contains volatile compounds.

13. A cellulose acylate film as claimed in claim 12, wherein said surface layers contain particle materials.

14. A cellulose acylate film to be laminated on a hydrophilic material, comprising:
    plural layers of cellulose acylate in which the average degree of a acylation of said cellulose acylate in said layers is different;
    a surface layer of said plural layers that is to be laminated on said hydrophilic material, wherein the average degree of acylation of cellulose acylate in said surface layer is in the range of 0.5 to 2.8; and
    wherein said average degree of acylation of cellulose acylate in each layer is adjusted by mixing plural cellulose acylates having different average degrees of acylation.

15. A cellulose acylate film as claimed in claim 14, wherein the contact angle of water on an outer surface of said surface layers is at most 60°.

16. A cellulose acylate film as claimed in claim 14, wherein at least one of said cellulose acylate, additives, and solvents is different between any adjacent two layers of said plural layers.

17. A cellulose acylate film as claimed in claim 14, wherein said plural layers are formed by performing solution casting of plural solutions for said plural layers such that said plural solutions may be sequentially overlaid on a substrate.

18. A cellulose acylate film as claimed in claim 17, wherein said surface layer contains an acid compound when peeled from said substrate, and said acid compound has an acid dissociation constant pKa in the range of 2.0 to 4.5 in an aqueous solution of 25° C.

19. A cellulose acylate film as claimed in claim 14, wherein at least one of said plural layers is comprised of cellulose acylates made from wood pulp, and remaining layers are comprised of cellulose acylates made from cotton linter.

20. A cellulose acylate film as claimed in claim 14, wherein at least one of said plural layers is comprised of a mixture of a cellulose acylate made from is wood pulp and a cellulose acylate made from cotton linter, and remaining layers are comprised of cellulose acylates made from said cotton linter.

21. A cellulose acylate film as claimed in claim 14, wherein other layers than said surface layer contain volatile compounds.

22. A cellulose acylate film as claimed in claim 21, wherein said surface layer contains particle materials.

23. A cellulose acylate film to be laminated on a hydrophilic material, comprising:
    plural layers of cellulose acylate including at least a first layer and a second layer, said first layer having a first surface to be stacked on said hydrophilic material and a second surface on said second layer;
    wherein the average degree of acylation of cellulose acylate in said first layer is in the range of 0.5 to 2.8, and the average degree of acylation of cellulose acylate in said second layer is different from that of said first layer.

24. A cellulose acylate film as claimed in claim 23, wherein the a contact angle of water on an outermost surface of said first layer is at most 60°.

25. A cellulose acylate film as claimed in claim 23, wherein at least one of materials, additives and solvents of said cellulose acylate is different between said first layer and a second layer.

26. A cellulose acylate film as claimed in claim 23, wherein said plural layers are formed by performing a solution casting of plural solutions in which a solution for said first layer is on a solution for said second layer, such that said solution for said first layer may contact a substrate.

27. A cellulose acylate film as claimed in claim 26, wherein when said plural layers are peeled from said substrate, said first layer contains an acid compound, and said acid compound has an acid dissociation constant pKa in the range of 2.0 to 4.5 in an aqueous solution of 25° C.

28. A cellulose acylate film as claimed in claim 27, wherein one of said first and second layers is comprised of cellulose acylates made from wood pulp, and another one is comprised of cellulose acylates made from cotton linter.

29. A cellulose acylate film as claimed in claim 27, wherein one of said first and second layers is comprised of a mixture of cellulose acylates made from wood pulp and a cellulose acylate made from cotton linter, and another one is comprised of cellulose acylates made from said cotton linter.

30. A cellulose acylate film as claimed in claim 27, wherein said plural layers include a third layer formed on said second layer, and said second layer contains volatile compounds.

31. A cellulose acylate film as claimed in claim 30, wherein said first and third layers contain particle materials.

32. A method of producing a cellulose acylate film to be laminated on a hydrophilic material, said method comprising:
    preparing plural solutions which include at least a first solution and a second solution, in said first solution a first material whose average degree of acylation is in the range of 0.5 to 2.8 being dissolved in a solvent, in said second solution a second material whose average degree of acylation is different from said first material being dissolved t-e in a solvent, said averaged degrees of acylation of said first and second materials being adjusted by mixing plural cellulose acylates whose average degrees of acylation are different;

casting said plural solutions on a substrate to form said cellulose acylate film having plural cellulose acylate layers in which a second layer is formed on a first layer, said first layer which is to contact said hydrophilic material being formed over said first solution, said second layer being formed of said second solution; and peeling said cellulose acylate film from said substrate.

33. A method as claimed in claim 32, wherein said first layer contacts said substrate.

34. A method as claimed in claim 33, wherein when said cellulose acylate film is peeled from said substrate, said first layer contains an acid compound, and said acid compound has an acid dissociation constant pKa in the range of 2.0 to 4.5 in an aqueous solution at 25° C.

35. A method as claimed in claim 34, wherein a main solvent of said first solution and said second solution is a non-chlorinated organic solvent.

36. A method as claimed in claim 35, wherein said substrate is one of a band and a drum.

* * * * *